United States Patent [19]

Saito

[11] Patent Number: 4,757,387
[45] Date of Patent: Jul. 12, 1988

[54] OPTICAL SYSTEM FOR A SINGLE-LENS REFLEX TYPE VIDEO STILL CAMERA

[75] Inventor: Mitsuru Saito, Ibaraki, Japan

[73] Assignee: Minolta Camera Kabushiki Kaisha, Osaka, Japan

[21] Appl. No.: 917,212

[22] Filed: Oct. 9, 1986

[30] Foreign Application Priority Data

Oct. 15, 1985 [JP] Japan .................................. 60-230748

[51] Int. Cl.$^4$ ........................ H04N 5/225; H04N 3/14
[52] U.S. Cl. ................... 358/225; 358/213.13; 358/909
[58] Field of Search ................. 358/909, 213.13, 225, 358/209

[56] References Cited

U.S. PATENT DOCUMENTS

| | | | |
|---|---|---|---|
| 4,554,585 | 11/1985 | Carlson | 358/225 |
| 4,626,918 | 12/1986 | Marisawa | 358/909 |
| 4,677,489 | 6/1987 | Nishimura et al. | 358/909 |
| 4,682,237 | 7/1987 | Kato et al. | 358/909 |

OTHER PUBLICATIONS

ITI Technical Report, vol. 8, No. 35, TEBS100-4, Dec. 1984.

Primary Examiner—Jin F. Ng
Assistant Examiner—Stephen Brinich
Attorney, Agent, or Firm—Burns, Doane, Swecker & Mathis

[57] ABSTRACT

A video still camera of the single lens reflex type is provided having a movable finder mirror for reflecting light passed through an objective lens, and a movable optical low-pass filter for preventing a light component having a spatial frequency lower than a predetermined value from being incident on an image receiving element. The finder mirror is located at a position in a photographing path through which photographing light passes when the camera is in a finder observation condition, while the optical low-pass filter is located at that position instead of the finder mirror when the camera is in a photographing condition. A driving device for selectively positioning either the finder mirror or the optical low-pass filter at the position is provided. The compactness of the video still camera is improved.

10 Claims, 7 Drawing Sheets

OPTICAL SYSTEM FOR A SINGLE-LENS REFLEX TYPE VIDEO STILL CAMERA

BACKGROUND OF THE INVENTION

1. Field of the Invention

This invention relates to a single-lens reflex type video still camera, and more particularly to improvement of its optical system.

2. Description of the Prior Art

A video still camera has an image sensing element and an optical low-pass filter arranged in front of said element. The optical low-pass filter is indispensable to prevent moiré which will be produced inevitably without such optical low-pass filter due to the structure of the image sensing element. In projecting a black and white image onto the image sensing element, for example, if an image having a spatial frequency close to the picture element pitch of the CCD in the image sensing element is projected on the image sensing element, moiré generated. When a color image is projected, moiré is also generated when the image component having the spatial frequency close to the pitch of the stripe filter for color dissolution of the CCD in the image sensing element is projected.

The optical low-pass filter is to cut off the component of the spatial frequency which causes moiré as described above, and is composed of double refraction material such as a crystal and fixed in front of the shutter mechanism arranged in front of the image sensing element.

Such a video still camera constructed in a single-lens reflex type has been introduced in ITE Technical Report Vol. 8 No. 35, TEBS100-4, December 1984. As shown herein by FIG. 14, the conventional single-lens reflex type video still camera includes a camera lens 2, an optical low-pass filter 8, a shutter mechanism 3 and an image sensing element 4 along the optical axis, wherein a finder mirror 5 and a half mirror 7 for direct light measurement are arranged between the camera lens 2 and the optical low-pass filter 8. A light bundle passing the lens 2 is reflected by the finder mirror 5 and focused into an image on a focusing plate 9. Thus, the image on the focusing plate 9 is observed visually through a pentaprism 10 and an eyepiece 12. When a shutter release button (not shown) of the camera is depressed, abovesaid finder mirror 5 is driven by a finder mirror driving mechanism (not shown) and goes up to a position shown at 5' outside of the photographing optical path. On the other hand, an aperture diaphragm 1 is stopped down to a predetermined aperture value by an aperture driving mechanism (not shown). The light bundle passing this aperture diaphragm 1 gets through the half mirror 7 and the optical low-pass filter 8 and is projected on an opening part of the shutter mechanism 3. A pair of shutter curtains (not shown) of the focal plane shutter mechanism 3 is operated after the operation of abovesaid finder mirror driving mechanism and the aperture driving mechanism is completed, and controls predetermined exposure time, and exposes the light bundle coming from aforesaid object to be photographed on a charge coupled device (CCD) 4a of the image sensing element 4. Besides, the half mirror 7 reflects a part of the light bundle which passed the aperture diaphragm 1 toward a light receiving element 11b.

However, in order to form such a construction as described above, it is required to provide a space to also locate the movable finder mirror 5 as well as the optical low-pass filter 8 between the rear end of the camera lens 2 and the image sensing element 4. This requires an increase in the back focal length of the camera lens system. Thus, the optical system becomes large in size and a compact single-lens reflex type video still camera is not obtainable.

SUMMARY OF THE INVENTION

It is an object of the invention to provide a single-lens reflex type video still camera which is made compact in size as the result of preventing the back focal length from being lengthened.

For that purpose, the present invention includes an optical low-pass filter which has been heretofore fixed in front of an image sensing element which is made movable. When a finder mirror is moved to the photographing position, the optical low-pass filter is positioned in front of the image sensing element. In this case, its position is the image observation position of the finder mirror so as to prevent the optical system from being lengthened in the direction of the optical axis due to positioning of the finder mirror. On the other hand, the movable optical low-pass filter is also moved to a position which does not prevent the finder mirror from advancing to the image observation position. Thus, the size of the optical system is prevented from increase when the video still camera is assembled into a single-lens reflex type camera.

DETAILED DESCRIPTION OF THE PREFERRED EMBODIMENTS

Figure 1:
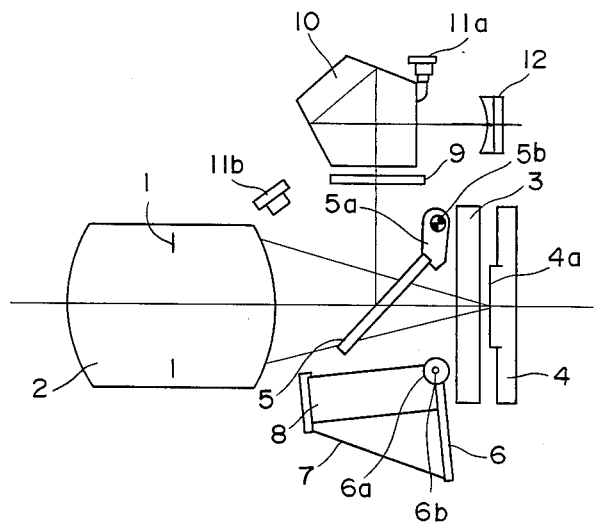
FIG. 1 is a side view showing the arrangement of an optical system at the time of image observation before photographing in a video still camera of a first embodiment according to the present invention.
Figure 2:
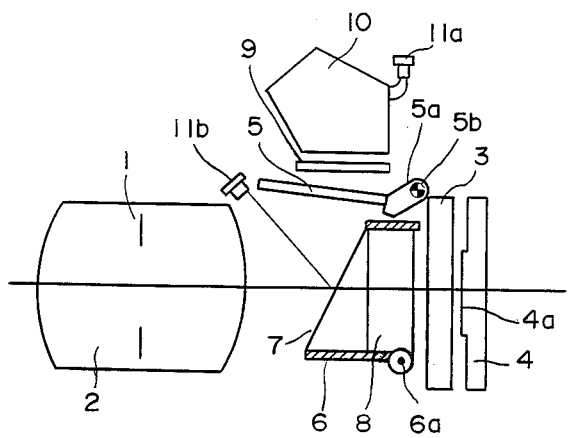
FIG. 2 is a side view of the optical system at the time of photographing of the first embodiment.

FIG. 1 and 2 are side views showing an optical system of a video still camera in a first embodiment according to the present invention. FIG. 1 shows the status at the time of image observation before photographing. In the drawing, there are provided a camera lens 2 having an aperture diaphragm 1, a mirror box (not shown), a shutter mechanism 3 having a pair of shutter curtains, and an image sensing element 4 having a charge coupled device (CCD) 4a arranged along an optical axis starting from the object side. On the side wall surface of said mirror box there is pivotally supported a finder mirror 5 having a finder mirror driving mechanism 5a, and this finder mirror 5 is rotated about rotation center 5b by the finder mirror driving mechanism 5a. At the lower part of the internal side surface of the mirror box there is pivotally supported a holder 6 having a holder driving mechanism 6a, and this holder 6 is rotated about rotation center 6b by the holder driving mechanism 6a. The holder driving mechanism 6a may also be of such a structure as to operate interlocking with abovesaid finder mirror driving mechanism 5a. The holder 6 integrally holds a half mirror 7 for direct light measurement and an optical low-pass filter 8 consisting of crystal. On the other hand, there are provided a focusing plate 9 at a position corresponding to the top surface of the mirror box and a pentaprism 10 above the focusing plate 9, both being arranged in the direction of the light reflected by the finder mirror 5. At the side portion of the pentaprism, a light receiving element 11a is provided for measuring ambient light. In the light passing through the pentaprism 10 is arranged an eyepiece 12. A light receiving element 11b used for photometry in flash photography is arranged at a position to which the light reflected from the half mirror 7 is directed. With such a structure, at the time of image observation, the light bundle passing through the camera lens 2 is reflected by the finder mirror 5 toward the focusing plate 9, and reaches the eye through the pentaprism 10 and the eyepiece 12.

Next, the operation in the first embodiment is described. When the shutter release button (not shown) is depressed, aforesaid finder mirror driving mechanism 5a is activated, and the finder mirror 5 is rotated clockwise about rotation center 5b to the photographing position which is out of the optical path as shown in FIG. 2. At the same time, the holder 6, whereby the optical low-pass filter 8 and the half mirror 7 for direct light measurement are held integrally, is rotated clockwise by the holder driving mechanism 6a about rotation center 6b into the photographing optical path. As shown in FIG. 2, the low-pass filter 8 is stopped at a position perpendicular to the optical axis, and the half mirror stops at a predetermined angle with the optical axis. Also, the aperture diaphragm 1 is stopped down from the minimum aperture value status by the aperture driving mechanism (not shown). After these operations are completed, the shutter mechanism 3 is operated and the shutter (not shown) is released. Only when the electronic flash device (not shown) is operated after the travel of the first curtain (not shown) of the shutter mechanism 3 is completed, the light bundle reflected by the half mirror 7 is incident on the light receiving element 11. Flash light emission of the electronic flash device is sustained by a control signal of a flash light measuring circuit in response to the flash light measurement, thus performing proper exposure to the image sensing element 4. In case of normal photographing without using the electronic flash device, the light measurement by the light receiving element 11a is stored before photographing, thereby proper exposure is performed. After travelling of the second curtain of the shutter mechanism 3 is completed, the finder mirror driving mechanism 5a is activated, thereby the finder mirror 5 is rotated counterclockwise about rotation center 5b and returns to the image observation position before photographing, i.e., the position shown in FIG. 1. The holder 6 is also rotated counterclockwise about rotation center 6b by the holder driving mechanism 6a, and returns to the position shown in FIG. 1.

Figure 3:
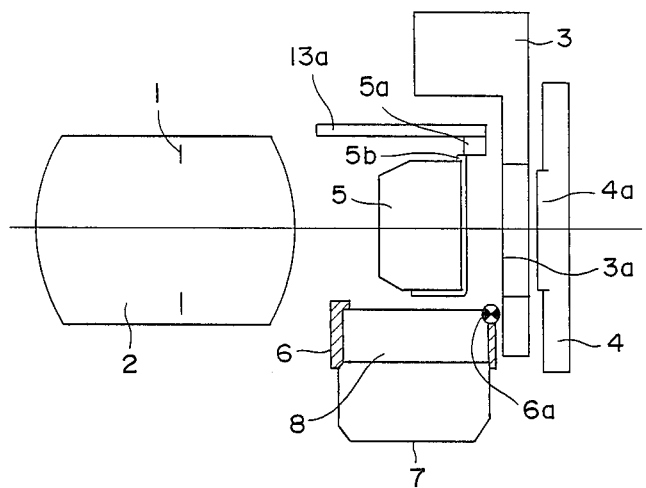
FIG. 3 is a top view of the arrangement of the optical system at the time of image observation before photographing in a video still camera of a second embodiment according to the present invention.
Figure 4:
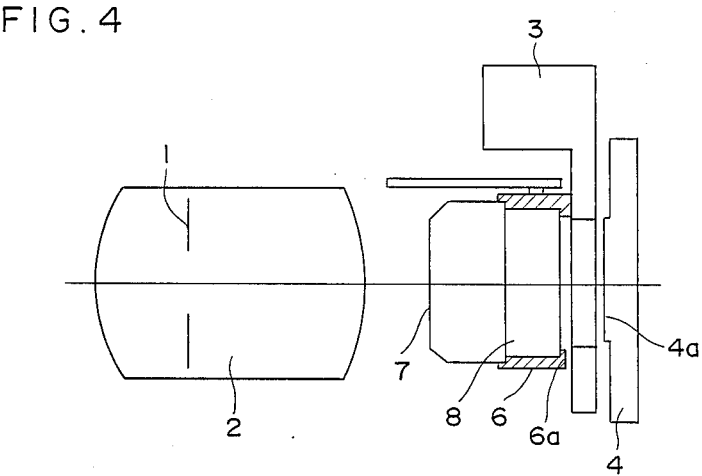
FIG. 4 is a top view of an optical system at the time of photographing in the second embodiment according to the present invention.

FIGS. 3 and 4 are top views of the optical system showing a second embodiment according to the invention. In this embodiment, the holder 6 is retracted to the side of the mirror box before photographing. FIG. 3 shows an optical system at the image observation position, but the finder mirror 5 is pivotally supported on a side wall 13a of a mirror box in the similar manner as the first embodiment. The finder mirror 5 located in the optical path, and has such a structure that it is rotated about the rotation center 5b by the finder mirror driving mechanism 5a. On the other hand, the holder 6 holding the half mirror 7 integral with the low-pass filter 8 has such a structure that it is pivotally supported on the mirror box wall (not shown) and is rotated clockwise about the rotation center 6b by the holder driving mechanism 6a.

Figure 5:
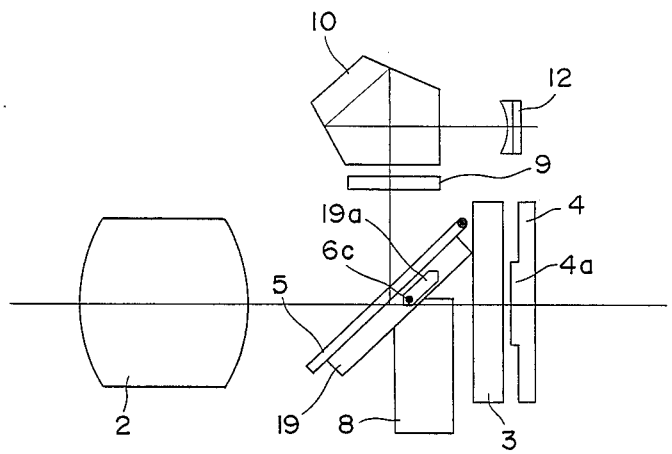
FIG. 5 is a side view showing the arrangement of an optical system at the time of image observation in a video still camera of a third embodiment according to the present invention.
Figure 6:
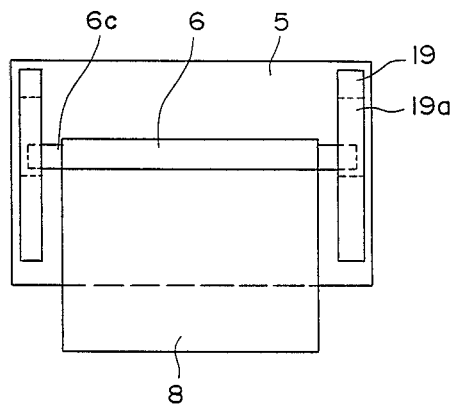
FIG. 6 is a rear view of a finder mirror and an optical low-pass filter in the third embodiment.
Figure 7:
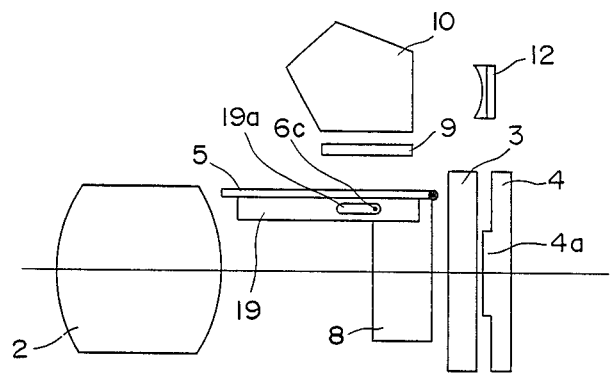
FIG. 7 is a side view showing the arrangement of an optical system at the time of photographing in the third embodiment.

Next, the operation in the second embodiment will be described. In the second embodiment, the finder mirror 5 moves from the image observation position to the photographing position in the similar manner as the first embodiment. For the holder 6 holding the low-pass filter 8 and the half mirror 7, when in the image observation position, the holder located on the side of the mirror box 13 is rotated clockwise by the operation of the holder driving mechanism 6a and is made to enter a position within the photographing optical path as shown in FIG. 4. As the result, the low-pass filter 8 stops at a position perpendicular to the optical axis and the half mirror 7 inclines at a predetermined angle with the optical axis and stops. FIGS. 5 and 7 are side views of an optical system showing a third embodiment of the invention at the image observation and photographing positions, respectively. FIG. 6 is a rear view of the finder mirror 5, an optical low-pass filter 8, and a holder 6 in the third embodiment. According to this embodiment, finder mirror holders 19 are provided at both ends on the plane reverse to the reflecting surface of the finder mirror 5. These finder mirror holders 19 are provided with long apertures 19a, respectively. In these apertures 19a is movably fitted a holder pin 6c projecting from the side of the holder 6 which holds the low-pass filter 8. The holder 6 is constructed so that it is moved up and down across the optical axis by a driving mechanism (not shown).

Next, the operation of this embodiment will be described. When the shutter release button is depressed, the holder 6 is elevated by a driving mechanism (not shown). At this time, the holder pin 6c projecting from both sides of the holder 6 moves along the aperture 19a, and rotates the finder mirror 5 clockwise and pushes it upward, thereby the holder 6 enters into the optical path and the finder mirror 5 is retracted out of the optical path, thus producing the status shown in FIG. 7. When photographing is completed, the driving mechanism is operated again, the holder 6 is made to go down, and the holder pin 6c also goes down. Therefore, the finder mirror 5 is rotated counterclockwise, and the holder 6 and the finder mirror 5 return to the image observation positions shown in FIG. 5. In this way, the optical low-pass filter 8 is not required to retract its whole body out of the photographing optical path. It is sufficient if retraction is made to such an extent that descent of the finder mirror to the image observation position is not disturbed.

Figure 8:
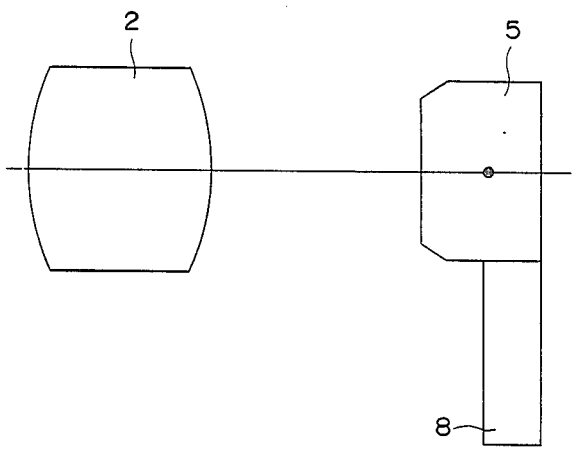
FIG. 8 is a top view showing the arrangement of an optical system at the time of image observation in a video still camera of a fourth embodiment according to the present invention.
Figure 9:
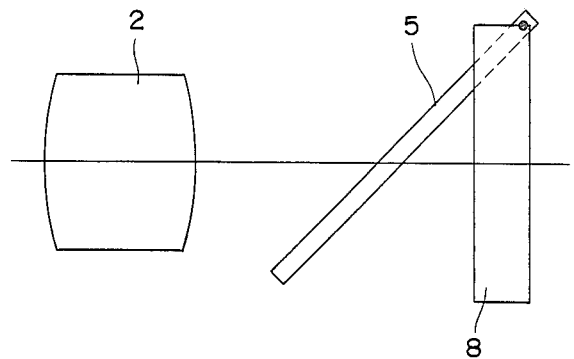
FIG. 9 is a side view of a video still camera in the fourth embodiment.
Figure 10:
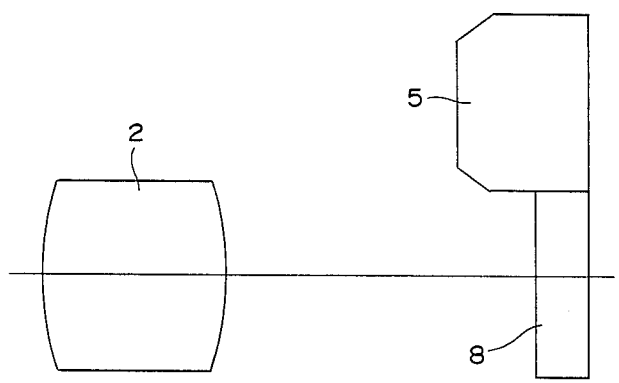
FIG. 10 is a top view showing the arrangement of an optical system at the time of photographing in the fourth embodiment.

FIGS. 8 and 10 are top views of an optical system showing a fourth embodiment according to the present invention at the image observation and photographing position, respectively. FIG. 9 is a side view of FIGS. 8 and 10. As shown in FIGS. 8 and 10, the low-pass filter 8 is fixed to a part of the side of the finder mirror 5, and keeps a position perpendicular to the optical axis and the finder mirror keeps a position at the angle of 45° with the optical axis. The integrally assembled low-pass filter 8 and the finder mirror 5 thus can move as a whole in the direction perpendicular to the optical axis as shown in the top view of FIG. 8. The finder mirror 5 is positioned in the optical path in the image observation condition and the low-pass filter 8 enters into the optical path in the photographing condition.

Next, the operation of this embodiment will be described. When the shutter release button (not shown) is depressed, a driving mechanism (not shown) is operated, and the low-pass filter 8 and the finder mirror 5 in the status shown in FIG. 8 are moved upward in parallel. The finder mirror 5 is retracted out of the optical path and the low-pass filter 8 is made to enter into the optical path, thus producing the status as shown in FIG. 10. When photographing is completed, the driving mechanism (not shown) is operated again, and the low-pass filter 8 and the finder mirror 5 are moved in parallel to their position at the image observation position, i.e., to the status shown in FIG. 8.

Figure 11:
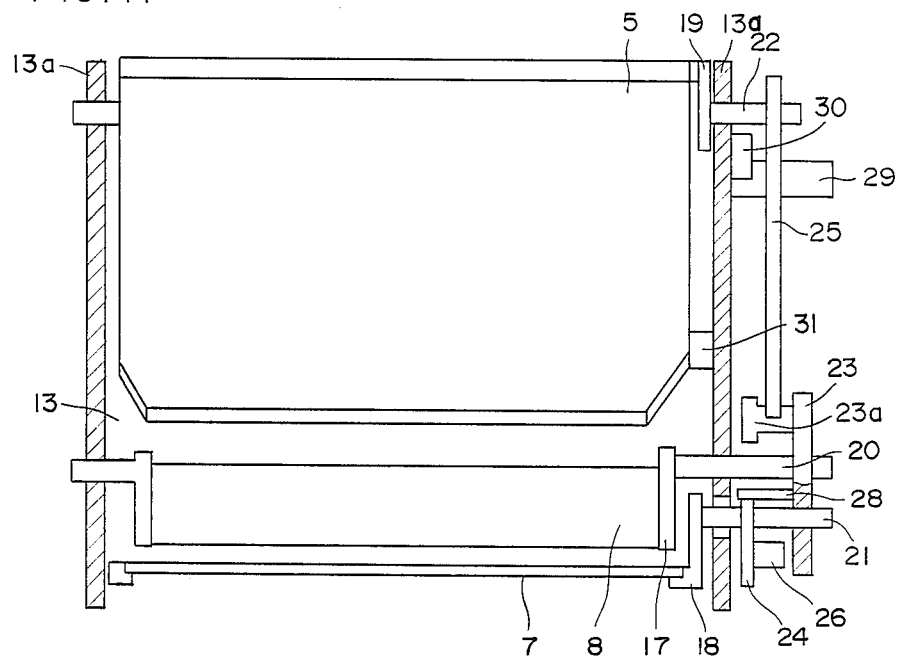
FIG. 11 is a front view showing an optical system at the time of image observation before photographing in a video still camera of a fifth embodiment according to the present invention.
Figure 12:
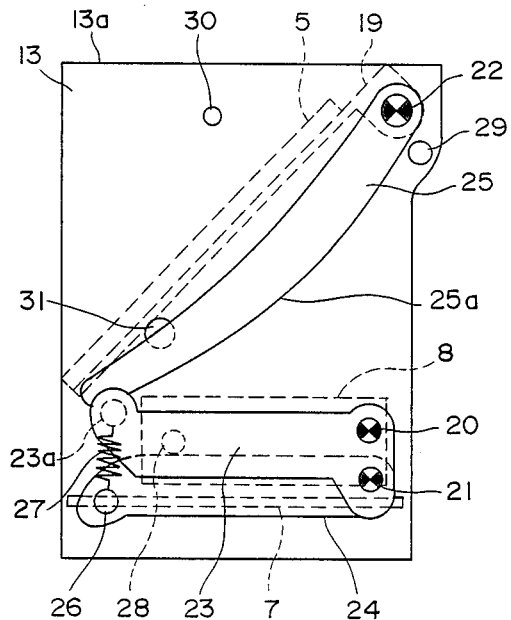
FIG. 12 is a side view of an optical system at the time of image observation in the fifth embodiment.
Figure 13:
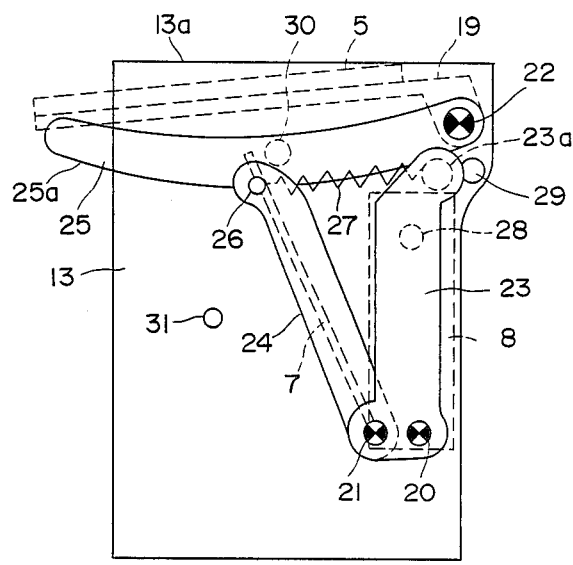
FIG. 13 is a side view showing an optical system at the time of photographing in the fifth embodiment.
Figure 14:
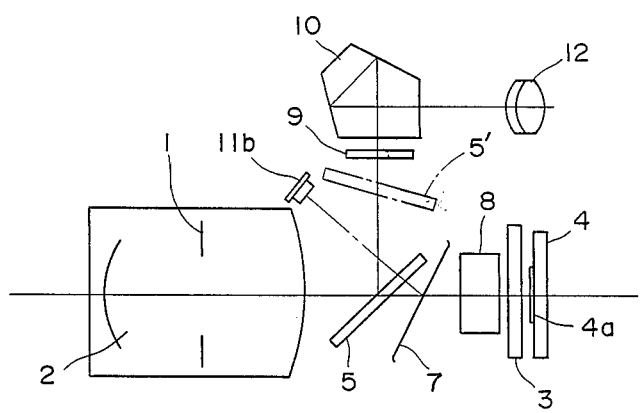
FIG. 14 is a side view showing the arrangement of an optical system of a conventional video still camera.

FIG. 11 thru FIG. 13 show a fifth embodiment according to the invention. The fifth embodiment is an example wherein the low-pass filter and the half mirror are retracted to the lower part of the mirror box in the similar manner as the first embodiment, but these are operated by one driving source (not shown). FIG. 11 is an illustration of the interior and exterior of the mirror box under image observation status before photographing as seen from the object side. FIG. 12 is a side view showing the finder mirror 5, the low-pass filter 8, and the half mirror 7 under the status shown in FIG. 11. FIG. 13 shows the mirror box as seen from the side at the photographing position in the fifth embodiment. As shown in FIG. 11, in the mirror box 13 surrounded by mirror box side wall 13a, there are provided the low-pass filter 8 and the half mirror 7 in the low part in parallel to the bottom of the camera body, and the finder mirror 5 in the central part at a position inclined at 45° with the optical axis. These are fixed to and held by a low-pass filter holder 17, a half mirror holder 18 and a finder mirror holder 19, respectively. These holders are also fixed to a low-pass filter driving lever 23, a half mirror driving lever 24, and a finder mirror driving lever 25 through a low-pass filter driving shaft 20, a half mirror driving shaft 21, and a finder mirror driving shaft 22, respectively. Said low-pass filter driving shaft 20, half mirror driving shaft 21, and finder mirror driving shaft 22 rotatably pierce the mirror box side wall 13a. As the result, the low-pass filter 8, the half mirror 7, and the finder mirror 5 are constructed in such a way that they are operated integrally with their respective driving levers, i.e., the low-pass filter driving lever 23, the half mirror driving lever 24 and the finder mirror driving lever 25. The low-pass filter driving shaft 20 is rotated by the operation of a driving source (not shown). Also, as shown in FIG. 12, the low-pass filter driving lever 23 is pivotally supported by the half mirror driving shaft 21. On the other hand, the low-pass filter driving lever 23 and the half mirror driving lever 24 are provided with a low-pass filter driving lever pin 23a and a spring pin 26 at the ends opposite to the positions where shafts are pivotted. The spring pin 26 and the low-pass filter driving lever pin 23a are tied up with each end (not shown in FIG. 12) of a spring 27. The spring 27 is normally contracted. From the low-pass filter driving lever 23, a half mirror driving lever pressure pin 28 projects out on the mirror box side. On the other hand, the lower surface of the finder mirror driving lever 25 forms a cam surface 25a. As the low-pass filter driving lever 23 is rotated clockwise, the cam surface 25a is pushed up by the low-pass filter driving lever pin 23a. Three stop pins protrude from the mirror box side wall 13a. The first one is a low-pass filter driving lever stop pin 29 for stopping the low-pass filter driving lever 23 at a predetermined position when it rotates clockwise and goes up. The second pin is a half mirror driving lever stop pin 30 for stopping the half mirror driving lever 24 at a position inclined at a predetermined angle with the optical axis when said half mirror driving lever 24 rotates clockwise following the low-pass filter driving lever 23 by the spring 27. The third pin is a finder mirror holder positioning pin 31 for stopping the finder mirror holder 19 at the position inclined at 45° with the optical axis at the image observation position before photographing. The first and the second stop pins 29 and 30 are protruded toward the outside from the mirror box side wall 13a, and the third stop pin 31 is protruded toward inside.

Next, the operation of this embodiment will be described. When the shutter release button (not shown) of the camera is depressed, a driving source (not shown) is operated and the low-pass filter driving lever 23 is rotated clockwise with the low-pass filter driving shaft 20 as the pivot. At this time, the half mirror driving lever 24 is rotated clockwise following the clockwise rotation of the low-pass filter driving lever 23 by the spring 27 provided between the low-pass filter driving lever pin 23a and the spring pin 26. This half mirror driving lever 24 is stopped by the half mirror driving lever stop pin 30 protruding from the mirror box side wall 13a when it reaches a position having a predetermined inclination with the optical axis. Thus, the half mirror 7 is held at a predetermined angle with the optical axis. However, the low-pass filter driving lever 23 continues to rotate clockwise against the force of the spring 27 until it reaches a position perpendicular to the optical axis. At this position, the low-pass filter driving lever 23 hits against the low-pass filter driving stop pin 29 and is kept from further rotation. As shown in FIG. 13, the low-pass filter 8 and the half mirror are maintained at predetermined positions on the optical axis. Also, the low-pass filter driving lever 23 presses against a cam surface 25a while rotating clockwise, and the finder mirror driving lever 25 is pushed up to the upper part of the mirror box 13. With this movement, the finder mirror 5 fixed to the finder mirror driving lever 25 is retracted out of the optical path and is positioned at the upper part of the mirror box 13. This status shown in FIG. 13 represents the configuration in the photographing condition. After such operation is completed, a shutter mechanism (not shown) is operated and a shutter (not shown) is released.

When the shutter (not shown) is closed after exposure is completed, a driving source (not shown) is operated, and the low-pass filter driving lever 23 is rotated counterclockwise. During the counterclockwise rotation, the half mirror driving lever pressure pin 28 protruding from the low-pass filter driving lever 23 hits against the half mirror driving lever 24. The half mirror driving lever pressure pin 28 continues to rotate counterclockwise while pressing the half mirror driving lever 24, and the low-pass filter driving lever 23 and the half mirror driving lever 24 (and the low-pass filter 8, and half mirror 7 fixed to them) are thus moved back into the lower part of the mirror box 13. In the process of counterclockwise rotation described above, the position of the half mirror driving shaft 21 on which is pivotted the low-pass filter driving lever 23 is moved. Therefore, the low-pass filter driving lever 23 and the half mirror driving lever 24 are back in the lower part of the mirror box 13 while their top ends are made uniform. Also, the finder mirror driving lever 25 goes down following descent of the low-pass filter driving lever pin 23a. On the way, the finder mirror holder 19 hits against the finder mirror holder positioning pin 31 and is prevented from going down further. Since the finder mirror driving lever 25 is fixed to the finder mirror holder, it also stops when the finder mirror holder 19 is stopped. Thus, the finder mirror 5 is maintained with inclination at 45° with the optical axis.

According to the present invention, an optical low-pass filter is made movable so that a finder mirror and an optical low-pass filter may be arranged in an optical path utilizing the same space, thus enabling the photographing optical path length to be shorter than in a conventional single-lens reflex type video still camera. Furthermore, as the distance from the finder mirror to the image sensing element gets shorter, it is possible to allow a focusing plate located at a position conjugate with the image sensing element to get close to the optical axis. As the result, the size of the optical system may be made compact not only in the direction of the optical axis, but also in a direction perpendicular to the optical axis, thus a compact video still camera is obtainable. In addition, it is generally difficult to design a camera lens system having both a relatively long back focal length and a good correction of aberrations, especially in a wide-angle lens system, so the optical system which does not require long back focal length according to the present invention makes the lens system design easy.

Furthermore, in the abovementioned embodiments, the half mirror for direct light measurement as well as the low-pass filter are made movable, thereby provision of peculiar space in the optical path of the half mirror becomes unnecessary. Therefore for this reason also it is not required to lengthen the photographing optical path length.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claim, they should be construed as being included therein.

What is claimed is:

1. A video still camera comprising:
   an objective lens;
   image receiving means for receiving an image formed by light transmitted through the objective lens;
   spatial frequency cutting off means for cutting off a component of the light having a predetermined spatial frequency;
   reflecting means, movable between a finder observation position in a photographing path from the objective lens to the image receiving means and a photographing position retracted out of the photographing path, for reflecting light transmitted through the objective lens when the reflecting means is located at the finder observation position; and
   moving means for moving the spatial frequency cutting off means and the reflecting means wherein the reflecting means and the spatial frequency cutting off means are interlocking such that the spatial frequency cutting off means is moved into the photographing path when the reflecting means is moved from the finder observation position to the photographing position, and wherein the spatial frequency cutting off means is movable to a retracting position which permits movement of the reflecting means from the photographing position to be finder observation position.

2. A video still camera as claimed in claim 1, wherein the spatial frequency cutting off means comprises an optical low-pass filter.

3. A video still camera as claimed in claim 1, further comprising light measuring means for measuring an amount of light transmitted through the objective lens, second reflecting means for reflecting light transmitted through the objective lens towards the light measuring means, and means for interlocking the second reflecting means with the spatial frequency cutting off means whereby the second reflecting means moves with the spatial frequency cutting off means.

4. A video still camera as claimed in claim 3, wherein the second reflecting means comprises a half mirror through which a part of light incident thereon is transmitted.

5. A video still camera as claimed in claim 1, wherein the driving means includes means for interlocking the spatial frequency cutting off means and the reflecting means so that both of them are shifted in connection with each other.

6. A video still camera as claimed in claim 1, wherein the driving means includes means for pivotally supporting the reflecting means along a first rotational axis extending perpendicularly to an optical axis of the objective lens, means for pivotally supporting the spatial frequency cutting off means along a second rotational axis extending perpendicularly to the optical axis of the objective lens and the first rotational axis, and means for connecting the rotation of the reflecting means with the rotation of the spatial frequency cutting off means.

7. A video still camera as claimed in claim 1, wherein the driving means includes means for integrally mounting the reflecting means to the spatial frequency cutting off means, means for slidably guiding the spatial frequency cutting off means in a direction perpendicular to an optical axis of the objective lens and means for sliding the spatial frequency cutting off means integrally with the reflecting means.

8. A video still camera as claimed in claim 1, wherein the driving means includes means for pivotally supporting a reflecting means along a rotational axis extending perpendicularly to the optical axis of the objective lens, means for slidably supporting the spatial frequency cutting off means in a direction perpendicular to the optical axis of the objective lens, and means for connecting the rotation of the reflecting means with the slide operation of the spatial frequency cutting off means.

9. A video still camera comprising:
an objective lens;
image receiving means for receiving an image formed by light transmitted through the objective lens along a photographing path;
an optical low-pass filer for cutting off light having a spatia frequency component higher than a predetermined spatial frequency, wherein the filter is selectively movable to a position in the photographing path;
a finder mirror for reflecting light transmitted through the objective lens towards a finder optical system, wherein the finder mirror is selectively movable to the position in the photographing path; and
moving means for moving the optical low-pass filter and the finder mirror whereby one of them is selectively moved into the position in the photographing path.

10. A video still camera as claimed in claim 9, further comprising a half mirror for transmitting a part of the light transmitted through the objective lens towards the image receiving means and for reflecting another part of the light transmitted through the objective lens, means for moving the half mirror in connection with the finder mirror whereby one of them is selectively moved to the position in the photographing path, and light receiving means for receiving the part of the light reflected by the half mirror, wherein the light receiving means generates an output for controlling a flash light emission of a flash device.

* * * * *